(12) United States Patent
Yamamoto et al.

(10) Patent No.: US 6,425,468 B1
(45) Date of Patent: Jul. 30, 2002

(54) NON-CONTACT POWER SUPPLY APPARATUS AND PICKUP PORTION USED THEREIN

(75) Inventors: Kenzo Yamamoto; Satoshi Takashige; Haruyoshi Kitayoshi, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/594,499

(22) Filed: Jun. 15, 2000

(30) Foreign Application Priority Data

Jun. 29, 1999 (JP) .......................................... 11-184324

(51) Int. Cl.$^7$ .................................................. B16L 9/00
(52) U.S. Cl. ............................................................ 191/10
(58) Field of Search ............................... 191/10; 310/12, 310/14; 336/130, 131, 175, 221

(56) References Cited

U.S. PATENT DOCUMENTS

| 5,467,718 A | 11/1995 | Shibata et al. | |
| 5,808,537 A | * 9/1998 | Kondo et al. | 336/130 |
| 5,927,657 A | * 7/1999 | Takasan et al. | 191/10 |
| 6,109,405 A | * 8/2000 | Odachi et al. | 191/10 |

FOREIGN PATENT DOCUMENTS

| JP | 05207606 | 8/1993 |
| JP | 08264357 | 10/1996 |
| JP | 993704 | 4/1997 |
| JP | 09252552 | 9/1997 |
| JP | 10023689 | 1/1998 |

* cited by examiner

Primary Examiner—Mark T. Le

(57) ABSTRACT

The present invention provides a non-contact power supply apparatus which is suitable for three-dimensional running by improving an allowable degree in a relative displacement of a carrier vehicle and a guide rail in the case where the carrier vehicle is running along the guide rail while receiving a drive power. The non-contact power supply apparatus has a pickup portion which is constructed in a manner that a pair of plate portions made of a magnetic material and having an area wider than a bonding area to an opening end are arranged in parallel, and are bonded or formed integrally with opposite surfaces of both opening ends of a pickup core having a C-letter or U-letter shape.

22 Claims, 9 Drawing Sheets

NON-CONTACT POWER SUPPLY APPARATUS AND PICKUP PORTION USED THEREIN

BACKGROUND OF THE INVENTION

The present invention relates to a non-contact power supply apparatus which can feed a power to each load from a feeder line of a primary circuit connected to an alternating current power supply via a pickup portion of a secondary circuit magnetically coupled to the feeder line in a physically non-contact state, and to a pickup portion used therein.

Conventionally, various handling systems have been employed such that a baggage is carried by using a carrier vehicle moving along a guide rail, and thereby, physical distribution has been effectively performed in a factory, a warehouse or the like. In general, a traction motor is used to tract such a carrier vehicle, and a drive power is supplied to the traction motor via a feeder line which is laid along the guide rail, and through which an alternating current flows.

In this feeding method, there are conventionally a trolley type and a non-contact type. The trolley type is a system in which a collector provided on the carrier vehicle side contacts with a feeder line so as to feed an electric power. On the other hand, the non-contact type is a system in which a pickup portion provided on the carrier vehicle is arranged in the vicinity of a feeder line, and then, an induced power is generated in the pickup coil so as to obtain an electric power. The above trolley type requires maintenance because the collector is worn, and further, has a problem that dust and spark are generated. On the contrary, the non-contact type has no problem as described, and therefore, a non-contact type power supply apparatus has been frequently used.

FIG. 1A is a schematic view showing a conventional monorail type handling system, FIG. 2 is a schematic view showing a non-contact power supply apparatus used in the conventional monorail type handling system shown in FIG. 1A, FIG. 3 is a schematic side view showing a structure of a conventional carrier vehicle, and FIG. 4A is a schematic side view showing a relationship between a feeder line and a pickup portion provided on the carrier vehicle.

In FIG. 1A, FIG. 2, FIG. 3 and FIG. 4A, a reference numeral 1 denotes a guide rail of a monorail type handling system in a factory, 2 denotes a carrier vehicle, and 3 denotes a system controller. The guide rail 1 is formed into a multiple loop which is constructed in a manner of connecting each station (not shown) in accordance with a handling purpose, and is located on plane. Each crossing portion is provided with a switch/rail type diverge/merge portion 4 for selectively using either rail.

As shown in FIG. 4A, the guide rail 1 is formed into a substantially I-letter shape in its cross section in a manner that a support column portion 1*p* is stretched between an upper plate portion 1*u* and a lower plate portion 1*d*, which are parallel with each other. Further, one side of the guide rail 1 is attached with a support arm (not shown) at its one side with an approximately regular interval in a longitudinal direction, and thus, the guide rail 1 is located in a state of being suspended from a ceiling or the like of a factory via the support arm. A feeder line 5 constituting a power supply section is fixed to another side of the guide rail 1 over the entire length thereof in the longitudinal direction, and is connected with a power source section 6.

The feeder line 5 is arranged like a loop in a manner of being laid on each distal end portion of a pair of upper and lower many supporters 1*a* fixed to the side face of the guide rail 1. Further, the feeder line 5 is constructed in a manner that insulated single wires are bundled so as to form a twist wire and that the twist wire is coated with a resin material. On the other hand, the carrier vehicle 2 is constructed in a manner that a carrier 23 for detachably mounting a handling produce is suspended from a pair of front and rear vehicle body frames 21 and 22 having a U-letter shape as shown in FIG. 3.

The vehicle body frame 21 includes a drive trolley 21*a* which rolls in contact with the guide rail 1 at a position opposite to an upper surface of the upper guide rail 1, and a pair of swing preventive rollers 21*b* and 21*c* which individually roll in contact with both upper and lower surfaces of the guide rail 1 at a position opposite to these surfaces. Further, the vehicle body frame 21 is provided with a motor M connected to the drive trolley 21*a* at its upper portion. Moreover, a pickup portion 24 as shown in FIG. 4A is provided at a portion opposite to the feeder line 5 of the guide rail 1 in the vehicle body frame 21.

The pickup portion 24 comprises a pickup core which is formed into an E-letter shape when viewing from its side, and the pickup core is constructed in the following manner. More specifically, in the pickup core, an upper plate portion 24*b*, a lower plate portion 24*c* and an middle plate portion 24*d* are arranged in parallel with each other, and are extended individually from upper, lower and intermediate portions of a back plate portion 24*a* made of a magnetic material and having a rectangular shape. Further, coils 24*e* and 24*e* comprising a litz wire are wound around each of upper and lower portions of the back plate portion 24*a* divided by the middle plate portion 24*d*.

Each feeder line 5 is positioned and set in two concave portions of the above pickup portion 24 having an E-letter shape when viewing from its side and in a state of being close to each coil 24*e*;24*e*. An induced power is generated in each coil 24*e*;24*e* by an electric power supplied to each feeder line 5, and then, is supplied to the motor M via a power conversion section 7 as shown in FIG. 2.

The induced power generated in each coil 24*e* varies depending upon a length of the pickup core (a length in an extending direction of the feeder line 5) so long as the number of turns of the coil 24*e* and a power supplied to the feeder line 5 are the same. Thus, it is general to employ a method of varying the length of the pickup core in accordance with a power required for a load side and an incoming capacity of the coil 24*e* so as to obtain a required power.

By the way, when the length of the pickup core is determined, swing angles α and β (α: vertical (upper and lower) swing angle as shown in FIG. 4B, β: transverse (right and left) swing angle as shown in FIG. 4C) are determined. The swing angles are a condition for making no interference of the pickup core with the feeder line 5 from an interval between the upper plate portion 24*b* and the middle plate portion 24*d*, an interval between the middle plate portion 24*d* and the lower plate portion 24*c*, and an interval between the feeder line 5 and each coil 24*e* in the pickup core, or the like.

In order to make large the swing angles α and β, it is necessary to wider set the aforesaid intervals between the upper plate portion 24*b* and the middle plate portion 24*d*, between the middle plate portion 24*d* and the lower plate portion 24*c*, and between the feeder line 5 and each coil 24*e*. However, when these intervals are set wider, the pickup core itself is inevitably formed into a large size. Moreover, an air gap is enlarged, and thereby, a magnetic resistance becomes large; as a result, a problem has arisen such that an incoming capacity is reduced. Therefore, in the case where the pickup core is constructed in the manner as described above, the swing angles α and β are set as follows. More specifically, the swing angle ρ is merely set to such a degree that the carrier vehicle 2 is capable of being turned along the guide rail 1 in a horizontal plane; on the other hand, the swing angle α is merely set to such a degree that an error when attaching the carrier vehicle 2 to the guide rail 1 is avoided. For this reason, an arrangement pattern of the guide rail 1 is limited within a range similar to a substantially horizontal plane as shown in FIG. 1A. In particular, it is difficult to make an arrangement pattern of the guide rail 1 as shown in FIG. 1B having a difference in a height, and therefore, there is a problem that a degree of freedom is remarkably limited.

FIG. 5A is a schematic side view showing a construction of a conventional another pickup portion disclosed in Japanese Patent Application Laid-Open No. 9-252552(1997). In FIG. 5A, a reference numeral 1 denotes a guide rail, 5 denotes a feeder line laid along the guide rail 1, and 24 denotes a pickup portion.

The pickup portion 24 comprises a pickup core which is formed into a C-letter shape when viewing from the side, and the pickup core is constructed in the following manner. More specifically, in the pickup core, an upper plate portion 24b and a lower plate portion 24c are arranged in parallel with each other, and are extended individually from upper and lower edge portions of a back plate portion 24a having a rectangular shape. Further, convex portions 24g and 24g having a rectangular shape in its cross section are fixed to each surface opposite to distal end portions of the upper and lower plate portions 24b and 24c, and a coil 24e is wound around the back plate portion 24a. Furthermore, an interval between the convex portions 24g and 24g is set approximately equal to a diameter of the feeder line 5, or is set slightly larger than that.

In the above pickup portion 24, as shown in FIG, 5A, the feeder line 5 is positioned inside the pickup core having a C-letter shape in a state of being close to the coil 24e, and then, a support arm of the feeder line 5 passes through between the convex portions 24g and 24g together with a movement of the carrier vehicle 2.

By the way, in the conventional construction as described above, as a method of obtaining a power required for a load side, there are a method of enlarging an air-gap area of the pickup core, and/or a method of reducing the air-gap length of the pickup core. According to a method of making long a pickup core length in the method of enlarging an air-gap area of the pickup core, the pickup core is made into a large size. Moreover, according to a method of making small the interval between the convex portions 24g in the method of reducing the air-gap length, an interference with the supporter 1a need to be avoided; for this reason, there is the limit in a reduction of the air-gap length. In order to obtain a required power, the above method of reducing the air-gap length must be employed together with the method of making long the pickup core length; as a result, the pickup core is inevitably made into a large size. Therefore, as shown in FIG. 5B and FIG. 5C, there is a problem that a vertical swing angle α of the pickup core becomes small with respect to the feeder line 5, and also, a transverse swing angle β of the pickup core becomes small.

BRIEF SUMMARY OF THE INVENTION

An object of the present invention is to provide a non-contact power supply apparatus which is suitable for three-dimensional running of a mobile such as a carrier vehicle or the like, and is compact and light with a simple structure, and further, can obtain a large incoming capacity, and to provide a pickup portion used in the non-contact power supply apparatus.

The pickup portion of the present invention generates an induced power, and includes a pickup core having a partially opening portion, and formed so as to surround a feeder line, a coil wound around the pickup core, and a pair of plate portions fixed individually to respective opening ends of the pickup core, and made of a magnetic material, each plate portion having an area larger than an area of portion fixed to each opening end. The non-contact power supply of the present invention is provided with the pickup portion having the aforesaid construction; therefore, it is possible to generate an induced power in the pickup portion on the basis of a power supplied to the feeder line.

In the present invention, the pair of plate portions made of a magnetic material and having an area wider than a fixing area are fixed to both opening ends of the pickup core surrounding the feeder line. Therefore, it is possible to reduce a width dimension of the pickup core, and to reduce an air gap between opening ends. Further, a magnetic path area is enlarged, and a magnetic resistance is greatly reduced, and thereby, a mutual inductance is increased, that is, an incoming capacity is increased. An allowable range in a change of orientation becomes large; therefore, the apparatus of the present invention is applicable to three-dimensional running of a mobile. Furthermore, it is possible to provide a small-size and light pickup core, and to improve a heat radiating effect, and to cheaply manufacture a pickup core.

Further, the pickup core is provided with an end portion which is formed integrally with a pair of plate portions arranged in parallel with the feeder line at an interval, at its opening portion. The pickup core has the end portion formed integrally with the plate portions at the opening portion; therefore, a manufacture of the pickup core is not troublesome.

Further, the pickup portion is constructed in a manner that a plurality of pickup cores are piled up in the form of plural stages in a state that respective opening ends are directed toward the same side so as to surround respective feeder lines. Therefore, the pickup cores surrounding the respective feeder lines are fixed in a state of being vertically piled up, so that an incoming capacity can be readily increased with a simple structure.

Further, the pickup portion is constructed in a manner that a plurality of pickup cores are arranged in parallel in a state that respective opening ends are directed toward the same side so as to surround a same feeder line. Therefore, the pickup cores are transversely arranged in a state that their sides are abutted against each other, so that an incoming capacity can be readily increased with a simple structure.

The above and further objects and features of the invention will more fully be apparent from the following detailed description with accompanying drawings.

DETAILED DESCRIPTION OF THE INVENTION

Preferred embodiments of the present invention will be described below in detail with reference to the accompanying drawings.

FIRST EMBODIMENT

Figure 6:
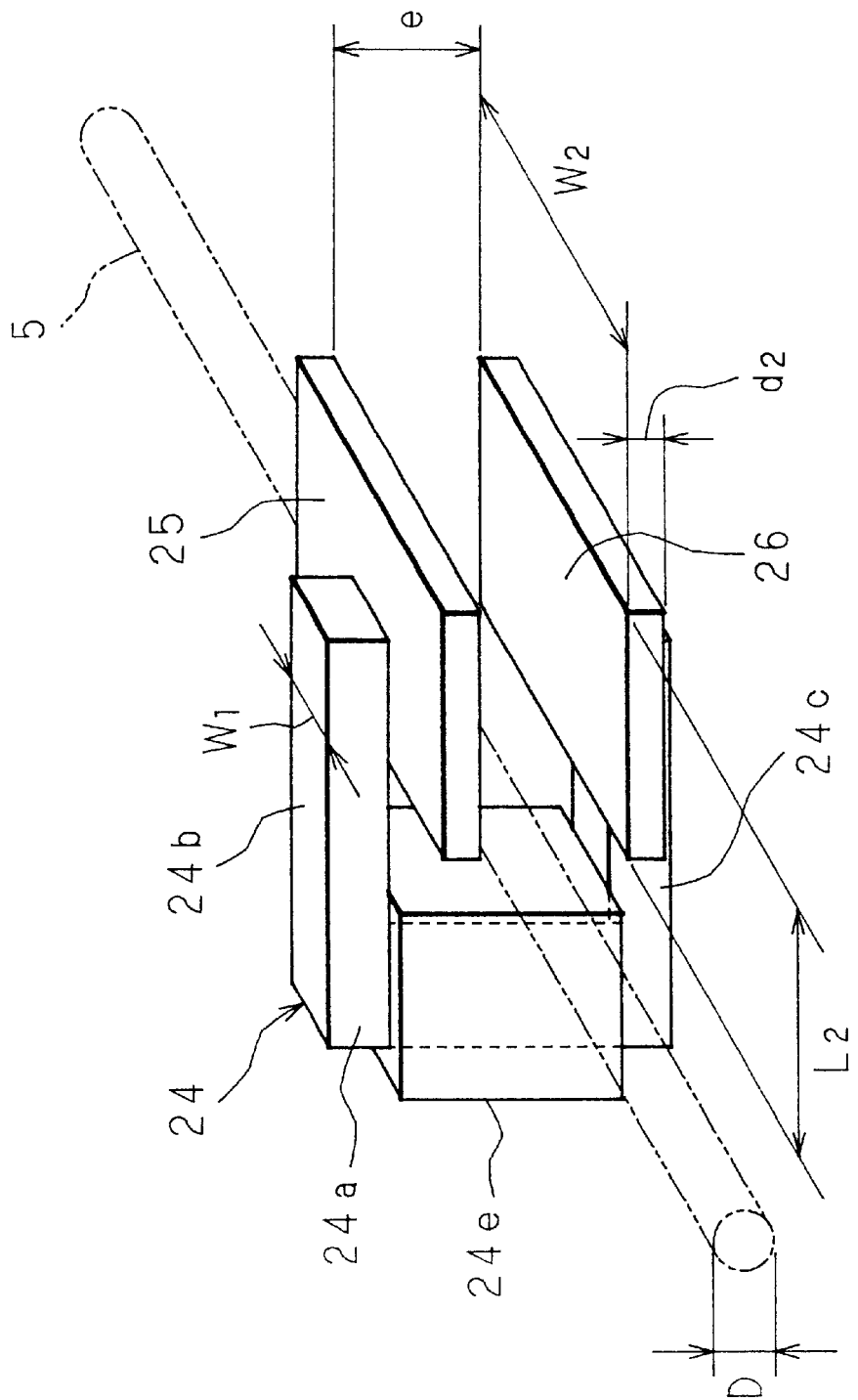
FIG. 6 is a perspective view showing a construction of a non-contact power supply apparatus according to a first embodiment of the present invention.
Figure 7A:
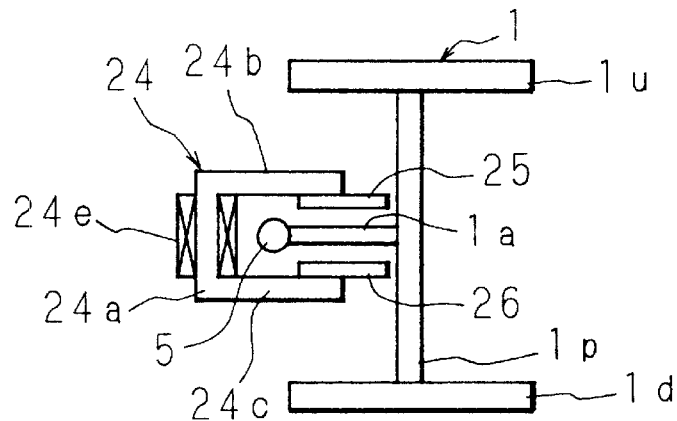
FIG. 7A, FIG. 7B and FIG. 7C are individually a schematic side view, a schematic top plan view and a schematic front view showing a relationship between a pickup portion of the present invention and a feeder line.

FIG. 6 is a perspective view showing a construction of a non-contact power supply apparatus according to a first embodiment of the present invention, and FIG. 7A is a schematic side view showing a relationship between a pickup portion and a feeder line. In FIG. 6 and FIG. 7A, a reference numeral 1 denotes a guide rail having a substantially I-letter shape in its cross section. The guide rail 1 is constructed in a manner that a support column portion 1p is stretched between an upper plate portion 1u and a lower plate portion 1d, which are parallel with each other. A feeder line 5 is arranged so as to be laid on a distal end portion of a supporter 1a fixed to the side of the guide rail 1. A pickup portion 24 is formed into a U-letter or C-letter shape, and is usually integrally molded using a magnetic material such as a metal, a ferrite or the like. Further, the pickup portion 24 has upper and lower plate portions 24b and 24c which have the same shape and dimension and are extended in parallel with each other from upper and lower end portions of a rectangular back plate portion 24a. A pair of plate portions 25 and 26 are formed using a magnetic material such as a ferrite or the like, and have the same rectangular shape and dimension to each other. The pair of plate portions 25 and 26 are bonded and fixed to opposite surfaces of the distal ends of the upper and lower plate portions 24b and 24c of the pickup core formed into a U-letter shape when viewing from the side. Each area S of the plate portions 25 and 26 is set larger than a bonding area $S_0$ of the plate portions 25 and 26 and the upper and lower plate portions 24b and 24c of the pickup core ($S>S_0$), and then, the upper limit of the area S is not specifically limited.

Moreover, the above plate portions 25 and 26 may be formed integrally with the opposite surfaces of the upper and lower plate portions 24b and 24c. In this case, each area S of the plate portions 25 and 26 is set larger than each area $S_0$ of each distal end portion of the upper and lower plate portions 24b and 24c.

Each width dimension $W_2$ of the plate portions 25 and 26 with respect to a width dimension $W_1$ of the pickup core has a relation of $W_1<W_2$, and to give an example, the plate portions 25 and 26 have the following dimension; more specifically, the width $W_2$: 100 mm, a length $L_2$: 40 mm, and a thickness $d_2$: 10 mm. Therefore, the width dimension $W_1$ of the pickup core is reduced to about one several in the case of comparing with the conventional apparatus shown in FIG. 4B, FIG. 4C, FIG. 5B and FIG. 5C. The plate portions 25 and 26 is not limited to a rectangular shape, and may be formed into a circular or ellipse shape, for example. Moreover, a distance e between opposite surfaces of the plate portions 25 and 26 is set slightly larger than a diameter D of the feeder line 5 and a thickness of the support arm, and more specifically, the distance e is about 20 mm in the case where the diameter of the feeder line 5 is 16 mm.

Figure 7B:
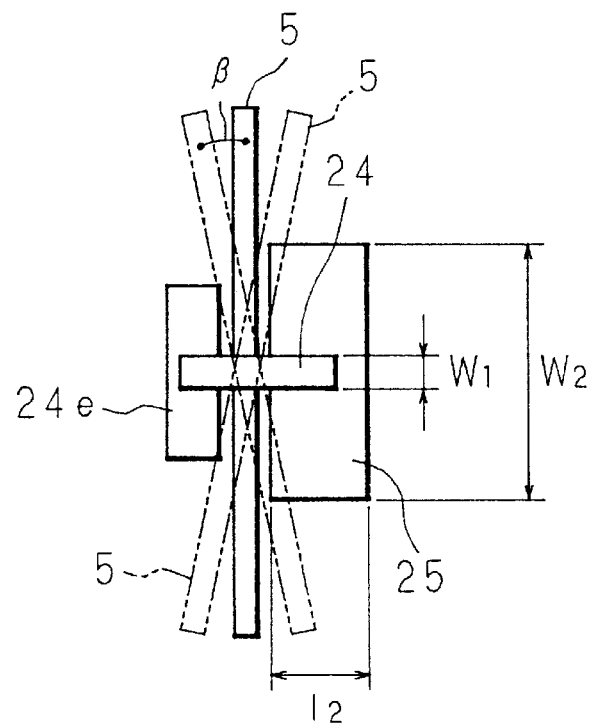
Figure 7C:
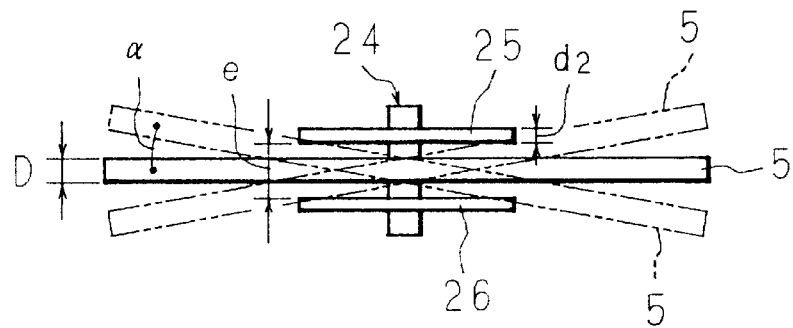

FIG. 7B is a schematic top plan view showing a relationship between a pickup portion and a feeder line, and FIG. 7C is a schematic front view showing the above relation. In the pickup portion 24 of this first embodiment, it can be seen that swing angles α and β in vertical (up and down) and transverse (right and left) direction to the feeder line 5 have an allowable range considerably larger than the conventional apparatus shown in FIG. 4B, FIG. 4C, FIG. 5B and FIG. 5C.

Figure 1A:
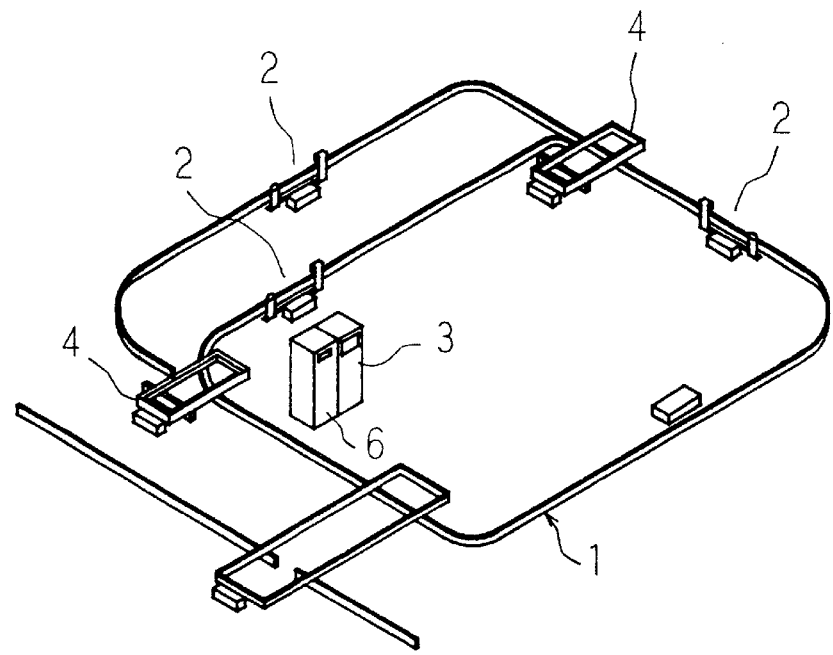
FIG. 1A is a schematic view showing one example of a monorail type handling system.
Figure 1B:
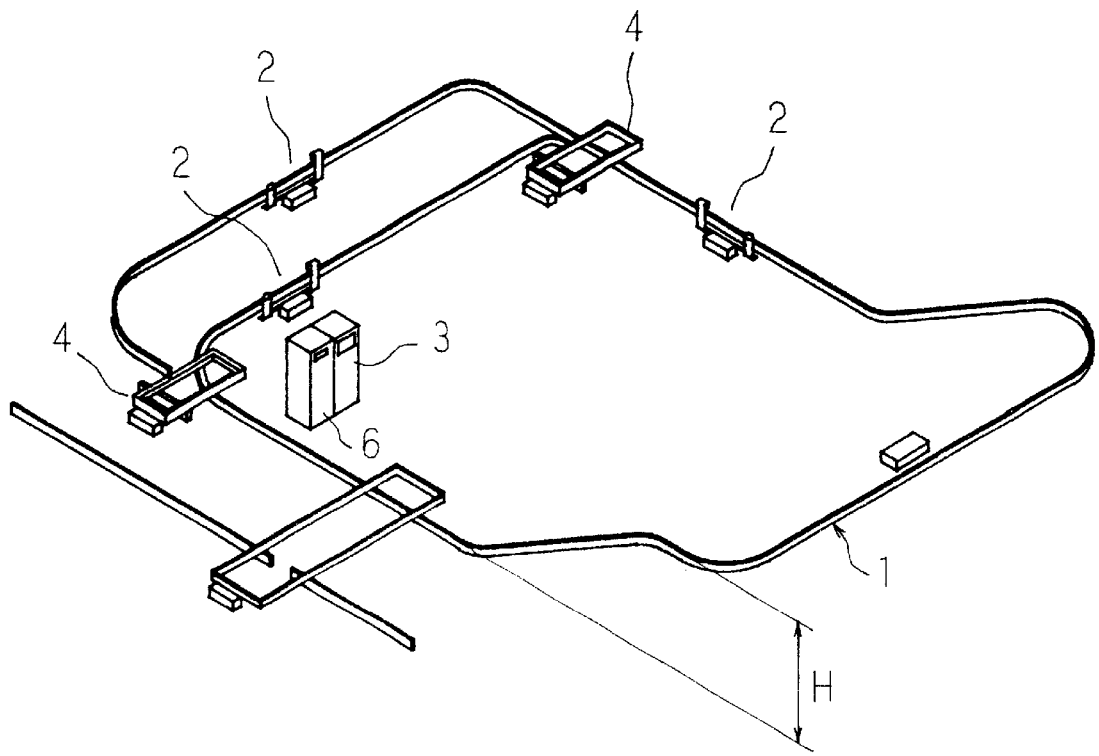
FIG. 1B is a schematic view showing another example of a monorail type handling system.
Figure 2:
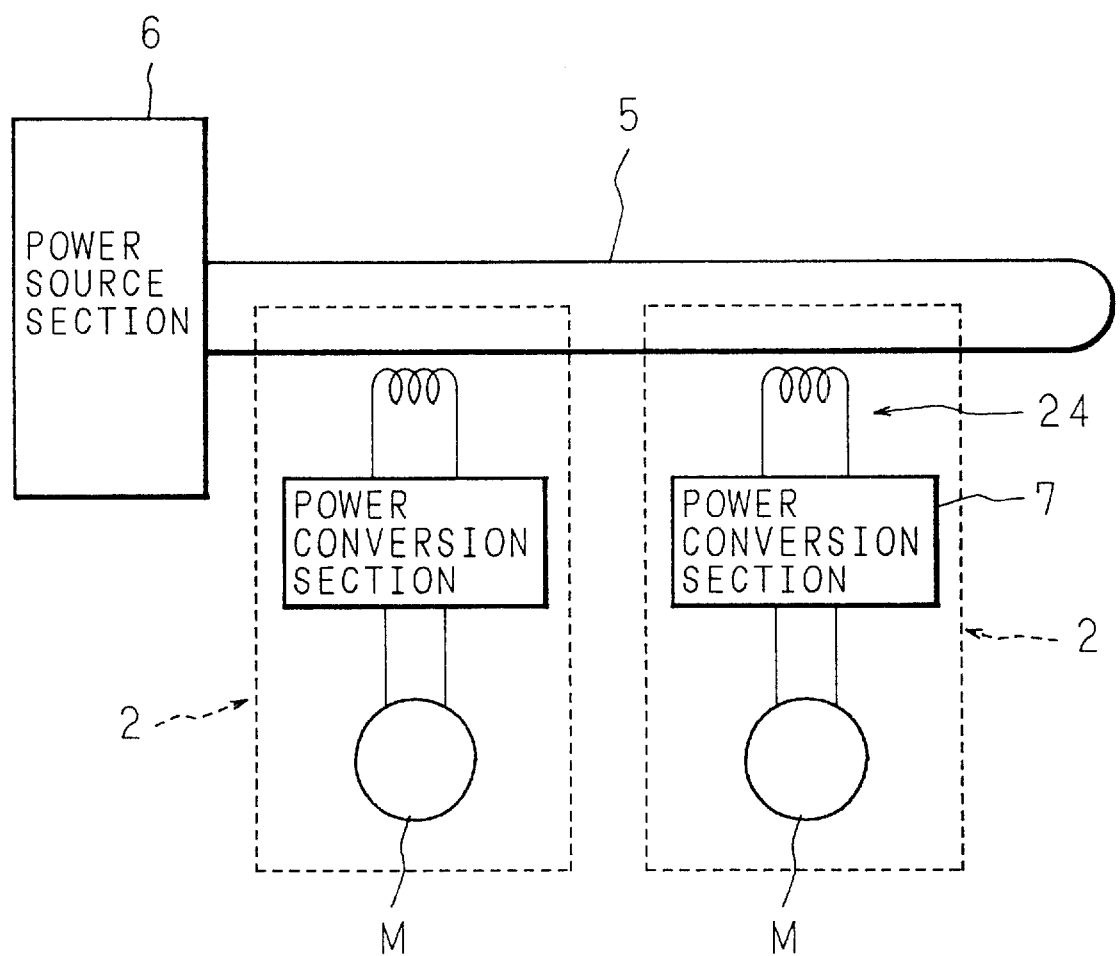
FIG. 2 is a schematic view showing a non-contact power supply apparatus used in the monorail type handling system.
Figure 3:
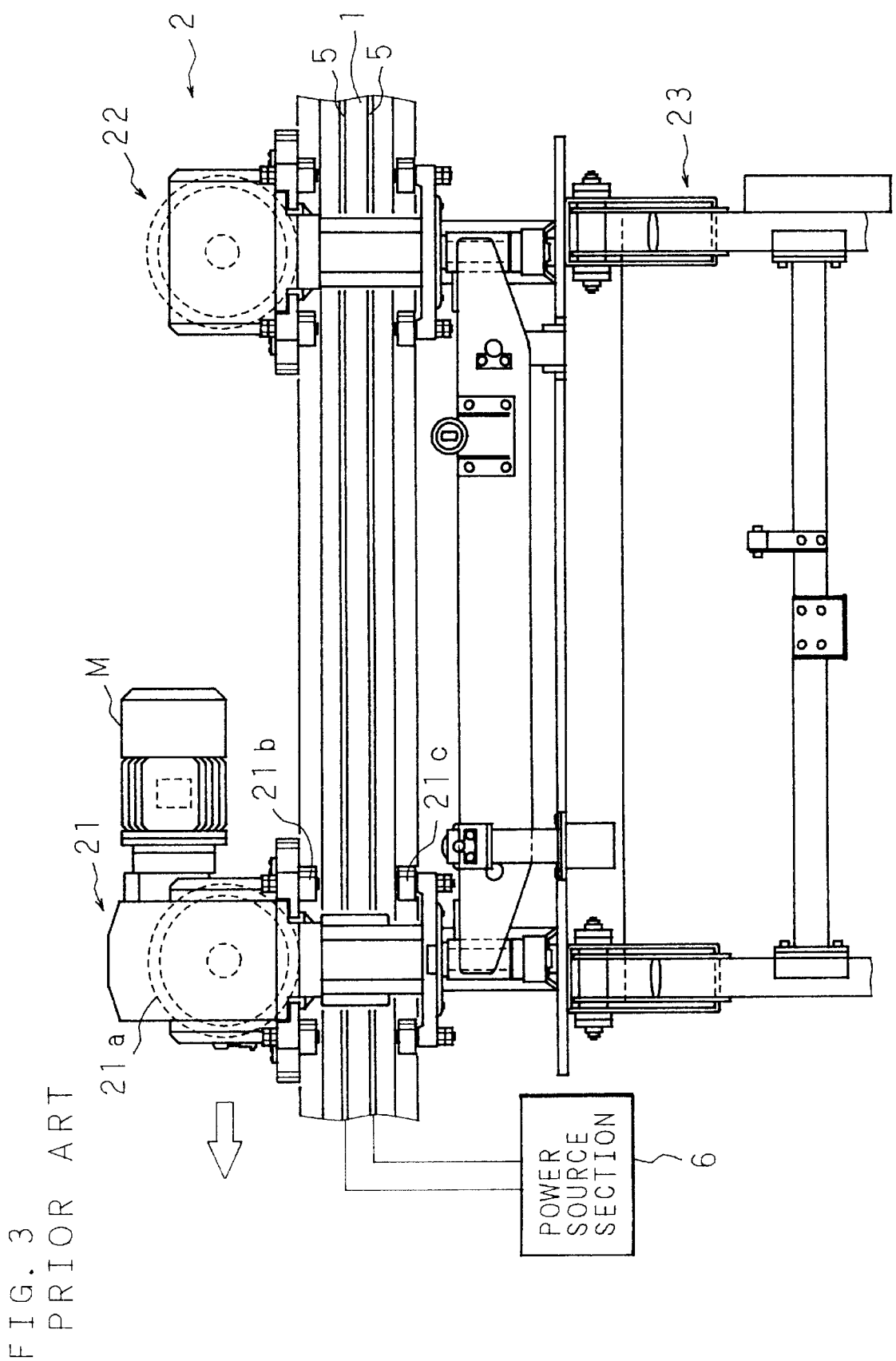
FIG. 3 is a schematic side view showing a structure of a conventional carrier vehicle.
Figure 4A:
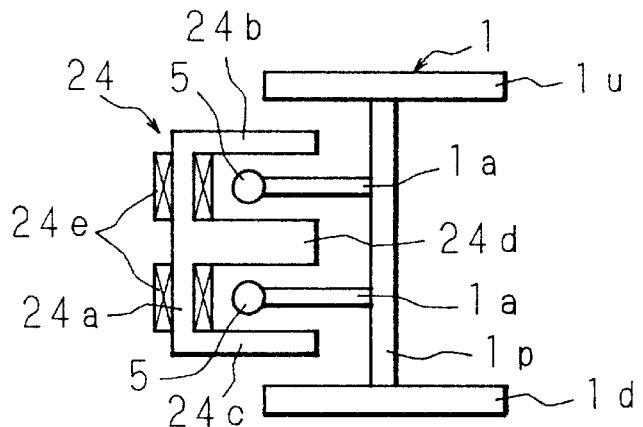
FIG. 4A, FIG. 4B and FIG. 4C are individually a schematic side view, a schematic front view and a schematic top plan view showing a relationship between a feeder line and a conventional pickup portion provided on a carrier vehicle.
Figure 4B:
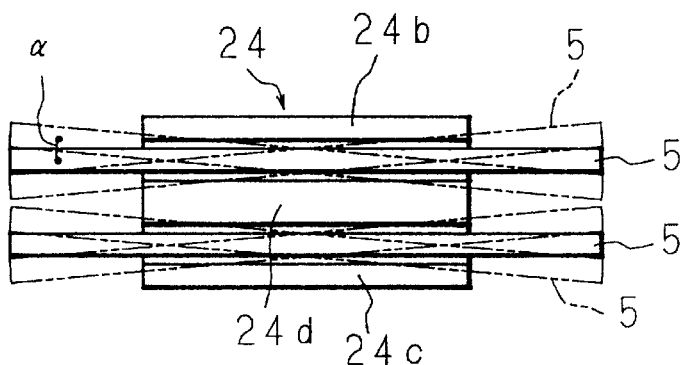
Figure 4C:
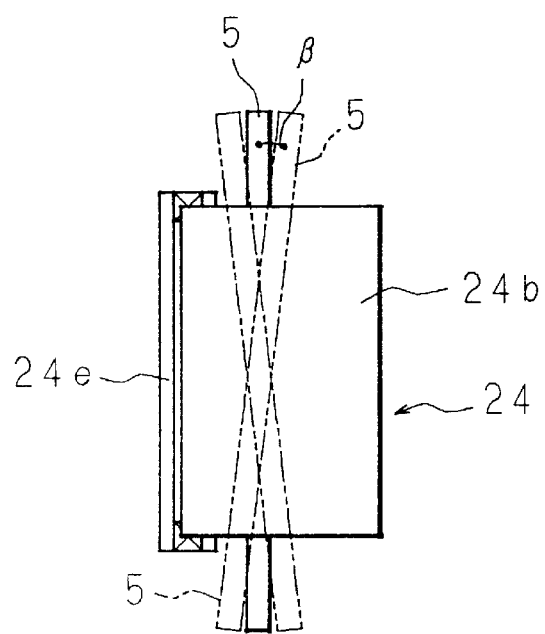
Figure 5A:
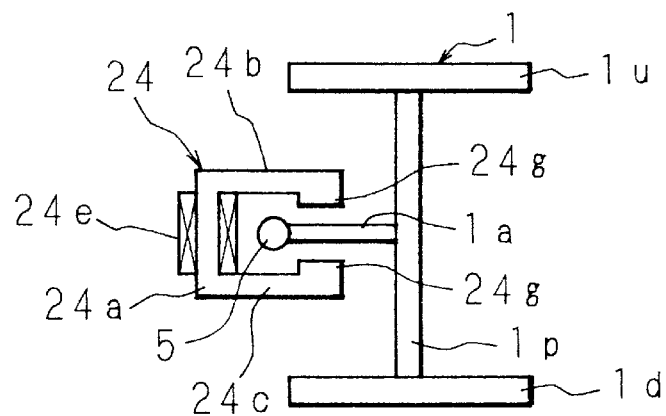
FIG. 5A, FIG. 5B and FIG. 5C are individually a schematic side view, a schematic front view and a schematic top plan view showing a construction of a conventional another pickup portion disclosed in Japanese Patent Application Laid-Open No. 9-252552(1997)
Figure 5B:
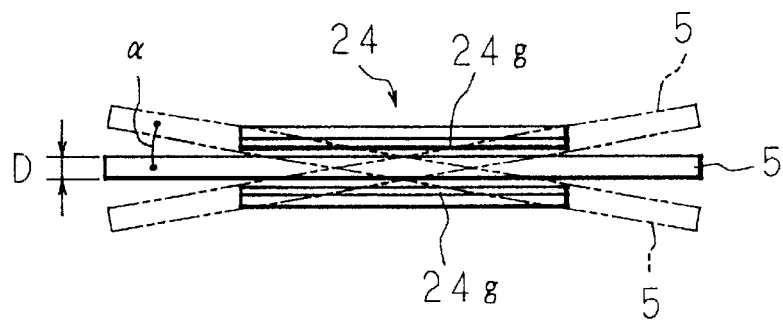
Figure 5C:
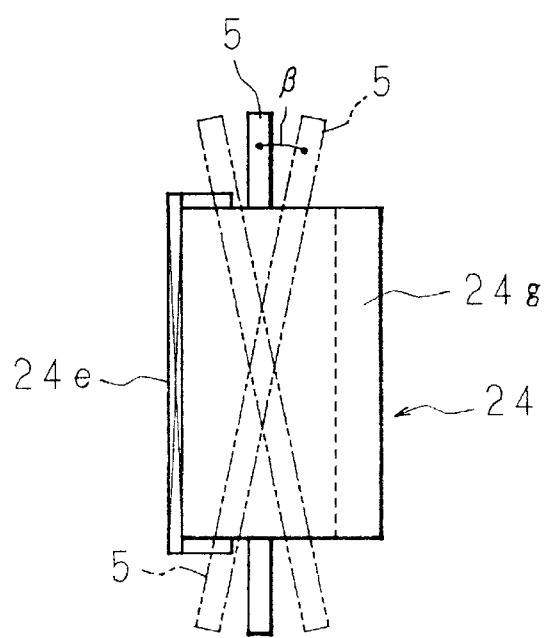

As described above, each area S of the plate portions 25 and 26 is set larger than the bonding area $S_0$ of the pickup core and the plate portions 25 and 26, so that a magnetic resistance can be greatly reduced by an enlargement of magnetic path area and by a reduction of air gap. Therefore, by the reduction of magnetic resistance, a mutual inductance is increased, that is, an incoming capacity is increased. Moreover, the pickup core becomes small in its width dimension $W_1$; therefore, the pickup core can be made into a light and compact size. As a result, a magnetic material is saved, and it is possible to achieve an increase of incoming capacity per mass of pickup core. In addition, the above pickup core is constructed as the pickup portion 24, and then, it is possible to mount it onto the guide rail 1 there-dimensionally arranged as shown in FIG. 1B. Therefore, an application range is improved, a heat radiating effect is excellent, and further, an incoming capacity is more increased.

SECOND EMBODIMENT

Figure 8A:
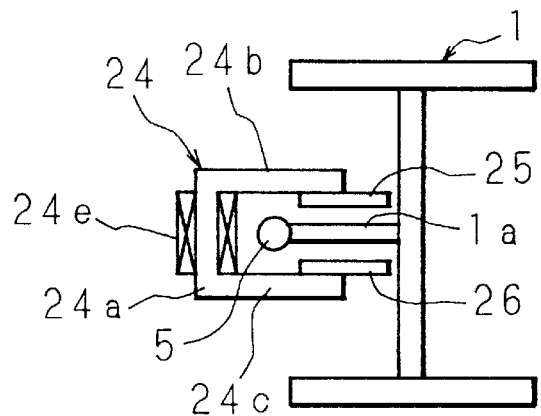
FIG. 8A is a schematic front view showing a construction of a pickup portion according to a second embodiment of the present invention.
Figure 8B:
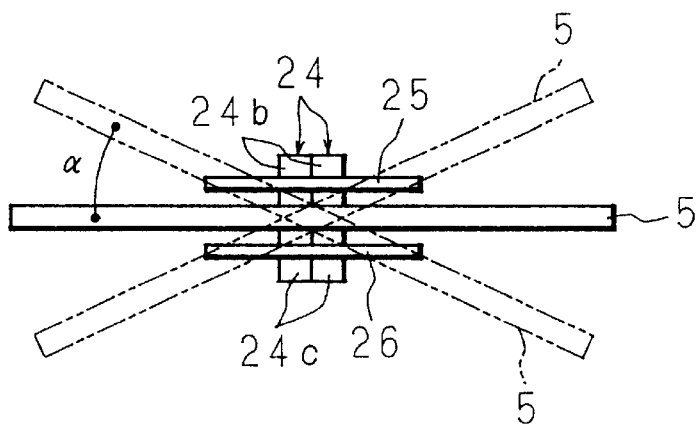
FIG. 8B and FIG. 8C are individually a schematic side view and a schematic top plan view showing a relationship between the pickup portion of the second embodiment and a feeder line.
Figure 8C:
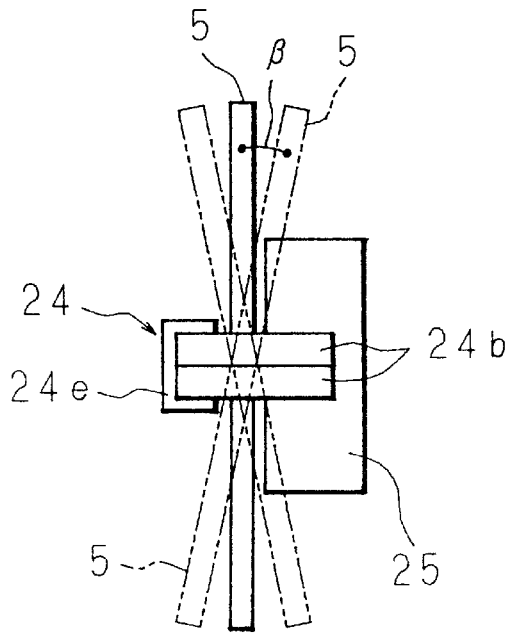

FIG. 8A is a schematic front view showing a construction of a pickup portion according to a second embodiment of the present invention, FIG. 8B is a schematic side view showing a relationship between the pickup portion of the second embodiment and a feeder line, and FIG. 8C is a schematic top plan view showing the same. In this second embodiment, two pickup cores of the pickup portion 24 shown in FIG. 6 having a U-letter shape are arranged in parallel so that their opening sides are positioned toward the same direction. Further, these two pickup cores are arranged in a state that their sides are abutted against to each other, and then, plate portions 25 and 26 are fixed to opposite surfaces of the upper and lower plate portions 24b and 24c in a state of being abutted against each other. The plate portions 25 and 26 are made of a magnetic material such as a ferrite or the like, and have the same rectangular shape and dimension. In this case, a ratio of the area S of the upper and lower plate portions 25 and 26 to the sum $2S_0$ of the bonding area $S_0$ of the upper and lower plate portions 25 and 26 and two pickup cores, is set to the substantially same ($S>2S_0$) as the relation described in the above first embodiment. Other constructions have the substantially same as the above first embodiment; therefore, like reference numerals are used to designated the portions corresponding thereto, and the details are omitted.

In this second embodiment, two pickup cores are provided; therefore, by a simple structure, an incoming capacity becomes twice as the case of the above first embodiment. The number of the pickup cores may be arbitrarily increased until a required incoming capacity is satisfied. Moreover, in this second embodiment, two pickup cores are provided; therefore, its width dimension is wider the pickup core of the first embodiment. As a result, allowable swing angles α and β in vertical and transverse directions as shown in FIG. 8B and FIG. 8C are slightly reduced; however, a great incoming capacity can be secured. Moreover, a reduction of air gap by the pair of plate portions 25 and 26, and the effect of reducing a magnetic resistance by an enlargement of magnetic path area are the same as the above first embodiment.

THIRD EMBODIMENT

Figure 9A:
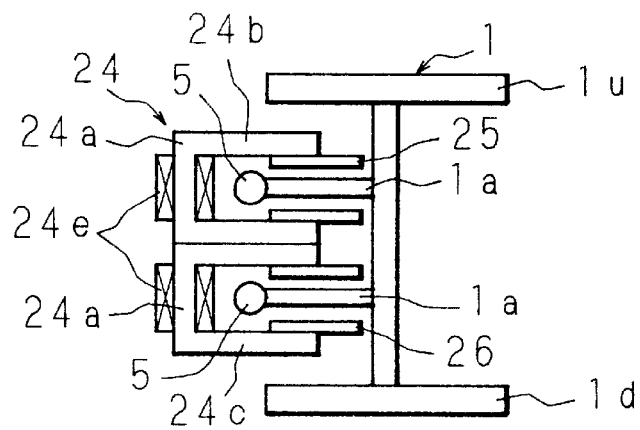
FIG. 9A is a schematic side view showing a construction of a pickup portion according to a third embodiment of the present invention.
Figure 9B:
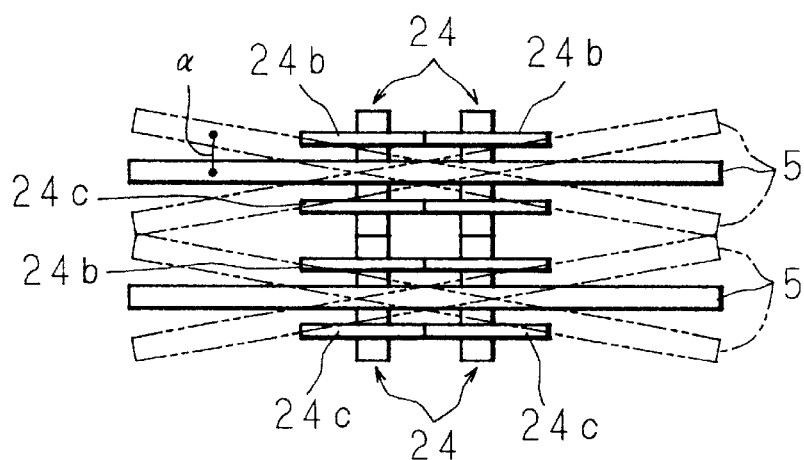
FIG. 9B and FIG. 9C are individually a schematic front view and a schematic top plan view showing a relationship between the pickup portion of the third embodiment and a feeder line.
Figure 9C:
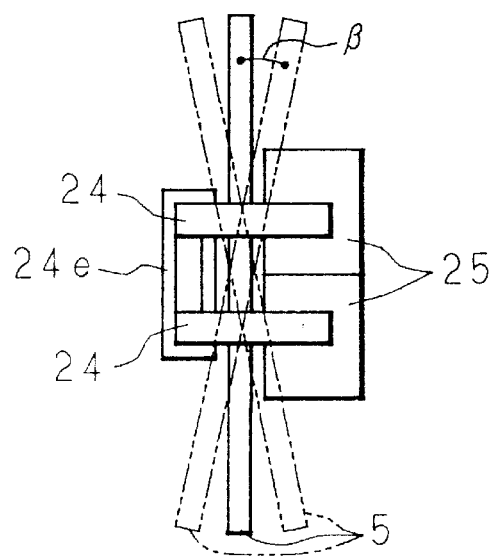

FIG. 9A is a schematic side view showing a construction of a pickup portion according to a third embodiment of the present invention, FIG. 9B is a schematic front view showing a relationship between the pickup portion of the third embodiment and a feeder line, and FIG. 9C is a schematic top plan view showing the same. In this third embodiment, two pickup portions 24 shown in the first embodiment are vertically arranged as one set, and then, two sets of pickup portions are provided in parallel. More specifically, the plate portions 25 or 26 made of a magnetic material such as a ferrite or the like are arranged in parallel in a state that their lateral end faces are abutted against each other, and then, an incoming capacity becomes four times as the pickup core shown in the first embodiment. Other constructions have the substantially same as the above first embodiment; therefore, like reference numerals are used to designated the portions corresponding thereto, and the details are omitted. Swing angles α and β of the feeder line 5 with respect to the pickup core becomes narrower than the above first and second embodiments because a width dimension between the pickup cores becomes slightly wide. However, an incoming capacity is considerably increased.

As this invention may be embodied in several forms without departing from the spirit of essential characteristics thereof, the present embodiment is therefore illustrative and not restrictive. Since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A non-contact power supply apparatus, comprising:
   a feeder line; and
   a pickup portion magnetically coupled to the feeder line in a non-contact state that supplies an induced power, wherein the pickup portion includes:
   a pickup core having a vertical portion and at least one horizontal portion, wherein said horizontal portion extends towards the feeder line so as to surround the feeder line;
   a coil wound around the pickup core; and
   a pair of plate portions fixed individually to respective open ends of the pickup core, and made of a magnetic material, each plate portion having an area larger than an area of the plate portion fixed to each open end, wherein one of the plate portions is fixed to the horizontal portion.

2. The non-contact power supply apparatus according to claim 1, wherein the pickup portion is constructed in a manner that a plurality of pickup cores are stacked in the form of plural stages in a state that respective open ends of the pickup core are directed toward the same side so as to surround respective feeder lines.

3. The non-contact power supply apparatus according to claim 1, wherein the pickup portion is constructed in a manner that a plurality of pickup cores are arranged in parallel in a state that respective open ends of the pickup core are directed toward the same side so as to surround a same feeder line.

4. A non-contact power supply apparatus according to claim 1, further comprising:
   a second horizontal portion wherein one of the plate portions is fixed to the second horizontal portion.

5. A non-contact power supply apparatus according to claim 1, wherein the pickup core is orientated about the feeder line at an arbitrary angle.

6. The non-contact power supply apparatus according to claim 1, further comprising an additional pickup core arranged in parallel with the pickup core, the additional pickup core having a partially open portion, wherein the pair of plate portions are fixed individually to respective open ends of the additional pickup core.

7. The non-contact power supply apparatus according to claim 6, wherein the two pickup cores have sides that are abutted to each other.

8. The non-contact power supply apparatus according to claim 1, wherein each open end of the pickup core has a width that is less than a width of each plate portion.

9. The non-contact power supply apparatus according to claim 1, wherein a distance slightly larger than a diameter of the feeder line separates opposite surfaces of the pair of plate portions.

10. The non-contact power supply apparatus according to claim 1, wherein each plate portion is rectangular.

11. The non-contact power supply apparatus according to claim 1, wherein the pickup core has a "C" shape.

12. A pickup portion magnetically coupled to a feeder line in a non-contact state that supplies an induced power comprising:
    a pickup core having a vertical portion and at least one horizontal portion, wherein said horizontal portion extends towards the feeder line so as to surround the feeder line;
    a coil wound around the pickup core; and
    a pair of plate portions fixed individually to respective open ends of the pickup core, and made of a magnetic material, each plate portion having an area larger than an area of the plate portion fixed to each open end, wherein one of the plate portions is fixed to the horizontal portion.

13. A non-contact power supply apparatus according to claim 12, further comprising:
    a second horizontal portion wherein one of the plate portions is fixed to the second horizontal portion.

14. A non-contact power supply apparatus according to claim 12, wherein the pickup core is orientated about the feeder line at an arbitrary angle.

15. A pickup portion magnetically coupled to a feeder line in a non-contact state that supplies an induced power, comprising:

a pickup core having a vertical portion and at least one horizontal portion, wherein said horizontal portion extends towards the feeder line so as to surround the feeder line, and being formed integrally with a pair of plate portions made of a magnetic material which are arranged in an open portion of the pickup core at an interval, each plate portion having an area larger than the horizontal portion; and a coil wound around the pickup core, wherein one of the plate portions is fixed to the horizontal portion.

16. A non-contact power supply apparatus according to claim 15, further comprising:

a second horizontal portion wherein one of the plate portions is fixed to the second horizontal portion.

17. A non-contact power supply apparatus according to claim 15, wherein the pickup core is orientated about the feeder line at an arbitrary angle.

18. A non-contact power supply apparatus, comprising:

a feeder line; and a pickup portion magnetically coupled to the feeder line in a non-contact state that supplies an induced power, wherein the pickup portion includes, a pickup core having a vertical portion and at least one horizontal portion, wherein said horizontal portion extends towards the feeder line so as to surround the feeder line, and being formed integrally with a pair of plate portions made of a magnetic material which are arranged in an open portion at an interval, each plate portion having an area larger than the horizontal portion; and a coil wound around the pickup core, wherein one of the plate portions is fixed to the horizontal portion.

19. The non-contact power supply apparatus according to claim 18, wherein the pickup portion is constructed in a manner that a plurality of pickup cores are stacked in the form of plural stages in a state that respective open ends of the pickup core are directed toward the same side so as to surround respective feeder lines.

20. The non-contact power supply apparatus according to claim 18, wherein the pickup portion is constructed in a manner that a plurality of pickup cores are arranged in parallel in a state that respective open ends of the pickup core are directed toward the same side so as to surround a same feeder line.

21. A non-contact power supply apparatus according to claim 18, further comprising:

a second horizontal portion wherein one of the plate portions is fixed to the second horizontal portion.

22. A non-contact power supply apparatus according to claim 18, wherein the pickup core is orientated about the feeder line at an arbitrary angle.

* * * * *